United States Patent [19]

Bachmann et al.

[11] Patent Number: 4,885,018
[45] Date of Patent: Dec. 5, 1989

[54] METHOD FOR MANUFACTURING ROTATIONALLY SYMMETRICAL POROUS SOLID BODIES

[75] Inventors: Peter K. Bachmann; Peter E. Geittner, both of Aachen; Hans-Jürgen Lydtin, Stolberg; Gerd Romanowski, Aachen, all of Fed. Rep. of Germany

[73] Assignee: U.S. Philips Corp., New York, N.Y.

[21] Appl. No.: 146,888

[22] Filed: Jan. 22, 1988

[30] Foreign Application Priority Data

Jan. 24, 1987 [DE] Fed. Rep. of Germany ....... 3702025

[51] Int. Cl.$^4$ ............................................. C03B 37/016
[52] U.S. Cl. ....................................... 65/3.11; 65/3.12; 65/18.1; 65/18.3; 65/901
[58] Field of Search ............................ 65/3.12, 3.11, 3.2, 65/18.1–18.4, 60.1, 60.51–60.8, 144, 900, 901

[56] References Cited

U.S. PATENT DOCUMENTS

| | | | |
|---|---|---|---|
| 4,173,459 | 11/1979 | Auuch et al. | 65/901 |
| 4,417,910 | 11/1983 | Passaret | 65/901 |
| 4,680,045 | 7/1987 | Osafune et al. | 65/901 |
| 4,680,046 | 7/1987 | Matsuo et al. | 65/901 |
| 4,680,048 | 7/1987 | Motoki et al. | 65/901 |
| 4,728,350 | 3/1988 | Cocito | 65/3.12 |

Primary Examiner—Robert L. Lindsay
Attorney, Agent, or Firm—Ernestine C. Bartlett

[57] ABSTRACT

Method of and arrangement for manufacturing rotationally symmetrical porous solid bodies.

A method of manufacturing rotationally symmetrical porous solid bodies, in which the starting material for the solid body in the form of a suspension consisting of the material for the solid body in solid form and a liquid dispersing agent, is introduced into a hollow mould whose geometry corresponds to that of the solid body to be formed, such that during the introduction of the suspension the hollow mould is rotated about its longitudinal axis, a certain quantity of solid of the suspension being deposited on the inner wall of the hollow mould, and excess residual suspension being removed, after which the green body thus formed is subjected to further process steps to manufacture the solid body, in which process suspension is introduced into the hollow mould in such doses that each time only thin solid layers having a thickness in the range from $10^{-3}$ to 5 mm are continuously deposited without interruption of the centrifuging process, the excess residual suspension being removed from the hollow mould in such a quantity that a layer of residual suspension having a thickness in the range from $10^{-1}$ to 100 mm always remains on top of the deposited solid matter. In this way, macroscopically homogeneously built porous solid bodies are obtained. FIG. 2.

18 Claims, 1 Drawing Sheet

METHOD FOR MANUFACTURING ROTATIONALLY SYMMETRICAL POROUS SOLID BODIES

FIELD OF THE INVENTION

The invention relates to a method of manufacturing rotationally symmetrical porous solid bodies, in which the starting material for the solid body, being a suspension consisting of the material for the solid body in solid form and a liquid dispersing agent, is introduced into a hollow mold whose geometry corresponds to that of the solid body to be formed, such that during the introduction of the suspension the hollow mold is rotated about its longitudinal axis, thereby depositing a certain quantity of solid of the suspension on the inner wall of the hollow mold and removing the excess residual suspension, after which the green body thus formed is subjected to further process steps to manufacture the solid body.

The invention further relates to an arrangement for carrying out this method, and to the use of the solid bodies manufactured by the present method.

BACKGROUND OF THE INVENTION

A method of the type described in the opening paragraph is known from the British patent publication GB 682 580. The object of the known method is to manufacture porous glass tubes, for example, for use as filters in laboratories. In which method it is important to obtain a highly uniform pore distribution and pore size between the sintered glass particles and to ensure that the pores are in communication with one another. For this purpose, suspensions of powdered glass having a highly uniform grain size are, prior to their introduction into the centrifuge where they form a loose bond of deposited solid particles on the inner surface, mixed under constant stirring with a binder which precludes settling of the solid particles. This procedure is followed to obtain a desired distribution of the solid particles in the suspension which is in conformity with the future porosity. A disadvantage of this method is that it requires a highly uniform grain size distribution of the starting material and, hence, correspondingly ground starting materials must be used. Moreover, grinding may lead to contamination of the material through abrasion. When commercially available powders are used, which have been formed through flame hydrolysis or precipitation, there is no longer a contamination risk, yet these powders generally exhibit a very coarse distribution of grain sizes. When such commerically available powders are used in the method described in GB 682 580, it is difficult to manufacture macroscopically, homogeneously built green bodies, since the particles of different particle size are separated in the centrifuging process and the deposited body then generally exhibits density gradients. During the further processing this may lead to problems such as, for example, cracks caused by contraction. Moreover, in the known method the filling of the centrifuge and the centrifuging process are operations which are separated in time, i.e. it is a discontinuous process, which renders the manufacturing process more expensive. Moreover, the formation of tubes having a greater wall thickness requires a repeated filling of the centrifuge, which involves time-consuming mounting operations. The process is particularly time-consuming when the porous body consists of many single layers, for example, having different compositions. In this case, the centrifuge has to be filled anew for each individual layer.

In a method known from the German patent application DE 3406148, powdered materials are used which are deposited in a thin liquid film by means of centrifugal force. In practice this method is satisfactory, but the feed rate of the powdered material must be adjusted to the rate of penetration in the liquid film. Otherwise there will be an accumulation of material on the liquid surface, which may lead to the formation of large agglomerates. In particular when commercially available powders are used these mechanisms limit the deposition rates and bring about inhomogeneities in the deposited solid body.

SUMMARY OF THE INVENTION

It is an object of the invention to improve the method mentioned in the opening paragraph, such that a macroscopically homogeneous, porous, rotationally symmetrical solid body consisting of several layers, possibly of different, predetermined composition can be readily manufactured in a continuous deposition process. Another object of the invention is the provision of such a continuous deposition process wherein the deposition rate is higher than in the known method and wherein powdered solid material is used which has no monodispersed grain size distribution, the green body output is higher and by which green bodies can be formed into crack-free solid bodies.

These and other objects are achieved by the method according to the invention, wherein the suspension is introduced into a hollow mold in such doses that each time only solid layers having a thickness in the range from $10^{-3}$ to 5 mm are consecutively deposited in a continuous process without interrupting the centrifuging process, and in that the excess residual suspension is removed from the hollow mould in a quantity such that there always remains a layer of residual suspension having a thickness in the range from $10^{-1}$ to 100 mm on top of the deposited solid matter.

Due to the centrifugal force, a separation of the suspended solid matter from the liquid phase of the dispersing agent takes place which corresponds to its grain size distribution. Consequently, a sedimentation layer covered by a layer of a liquid phase (residual suspension) is formed on the inner wall of the hollow mold. Since this layer contains no more deposited particles, its density is less than that of the subsequently supplied suspension. The solid is deposited from a thin suspension layer which is present in the interior of the hollow mold near the surface of the already deposited solid. FIG. 2 is a schematic representation thereof. This leads to high deposition rates due to the reduction of the sedimentation path. The thickness of the layer of residual suspension present on the deposited solid is determined by the difference in height between an overflow of the hollow mold and the surface of the deposited solid.

According to a preferred embodiment of the inventive method, the suspension is introduced into the hollow mold by means of a feeding device which can be moved over the entire length of the mold. Thus, it becomes possible to deposit single, thin solid layers over the entire length of the inner wall of the hollow mold. Due to this, particle size gradients can be distributed over many thin layers, thereby forming a macroscopically uniformly built green body. This leads to a large reduction in the formation of cracks when the green body is subjected to a drying process at a later stage. In this way, commercially available powders having a coarser distribution of grain sizes can be used for an economical production of porous solid bodies, the risk of an increased crack-formation during the further processing of the green body (drying, purifying, sintering) being excluded.

According to another preferred embodiment of the method according to the invention, it is efficacious to introduce the suspension into the hollow mold, such that it is directed substantially perpendicularly to the inner wall of the rotating hollow mold.

This also contributes to a reduction of the sedimentation path and, consequently, to a higher deposition rate.

According to another preferred embodiment of the method according to the invention, at first only the dispersing agent is introduced into the rotating hollow mold and then the suspension is introduced into the said mold. In this way well-defined flow ratios are obtained in the interior of the hollow mold at the beginning of the deposition process.

According to a further preferred embodiment of the method according to the invention, suspensions having a different composition are consecutively introduced into the rotating hollow mould to produce solid bodies having layers of a different chemical composition. In this way, multi-component solid bodies, for example doped preforms for producing optical waveguides, can be formed. Both the variation of the composition of a single injected suspension as well as the variation in time of the quantities of several suspensions which are introduced through different feeding devices are advantageous further embodiments to form porous solid bodies from several components.

According to especially preferred embodiments of the method according to the invention, (a) $SiO_2$ particles are used as a solid for the suspension, which particles may or may not have a doping which is suitable for the manufacture of a desired refractive index, and have a diameter in the range from 10 to 500 nm, preferably from 10 to 120 nm, with an average particle diameter of 40 nm; (b) distilled water is used as a dispersing agent; (c) substances having binding properties (for example polyvinyl alcohol) and/or (d) substances which induce a chemical reaction with the solid of the suspension, preferably ammonia, are added to the dispersing agent; or (e) or after the green body obtained has been removed from the mould, it is subjected to a treatment with substances which react with the solid of the green body and which solidify the surface of the green body.

Depending upon the dispersing agent used and the suspended solid a chemical reaction between the components of the suspension may lead to the etching of the particles. This process can also be brought about deliberately by adding suitable additives to the suspension. For example, when $SiO_2$ particles and (preferably binder-containing) distilled water are used to form the suspension, the addition of ammonia leads to a dissolution of part of the smaller $SiO_2$ particles. In a subsequent drying process, the dissolved particles are led to the surface of the porous green body and remain there after the dispersing agent has evaporated. This process may dramatically improve the mechanical stability of the porous solid body, because it leads to the formation of bridges between the individual particles. However, as a consequence thereof the surface is covered with an impervious thin layer of a solid body which has a tendency to crack-formation. However, this adverse effect can be avoided by covering the surface of the green body with a porous material. In this case, the transport of the dissolved solid does not end on the surface of the porous green body to be processed further, but on the additionally provided coating layer. The solid coating formed and the coating layer formed from a porous material can readily be removed from the green body. Thus, the tendency to the formation of cracks can be reduced substantially. However, the mechanical stability of a solid body manufactured by the method according to the invention can be improved when, after the deposition process, the porous green body is rinsed with a suitable chemical and, thus, subjected to a chemical aftertreatment.

According to a further embodiment of the method according to the invention, the green body is deposited in a two-step method in order to manufacture the solid body, in which in the first step of the method the hollow mold is made to rotate at an acceleration lower than that necessary for depositing the solid body, a certain quantity of solid matter consisting of agglomerates and/or the largest particles being deposited on the inner wall of the hollow mold, and excess residual suspension consisting of dispersing agent and smaller particles being removed, after which in a second step the residual suspension is introduced into a further hollow mold or a hollow mold which is free from sediment and which is rotated at the required acceleration for the deposition of the solid body. This can be carried out, for example, by subjecting the suspension to a preliminary centrifuging operation at a relatively low centrifuging rate. Very large particles, large agglomerates, but also impurities having a high density, are then removed from the suspension. This purified suspension is then fed-out via the overflow of the preliminary centrifuging means and can subsequently be fed to the hollow mold where it is subjected to the actual moulding process. This preliminary treatment may take place fully separated from the actual moulding process, however, as shown in FIG. 1, it can also be integrated in a continuous process.

An arrangement for carrying out the method according to the invention is characterized by a hollow mould for holding starting material for the solid body in the form of a suspension, which mold can be rotated about its longitudinal axis like a centrifuge and comprises a feeding device having an outlet, which feeding device can be moved through a detachable aperture diaphragm over the full length of the hollow mold, and an overflow for any excess dispersing agent or residual suspension, and at least a first reservoir, and possibly a second reservoir for the suspension, having supply pipes through which the suspension to be centrifuged can be introduced into the hollow mold by means of at least a first and possibly a second pump.

According to preferred embodiment of the arrangement for carrying out the method according to the invention, the hollow mold is coated on the inside of its wall with a coating of a material which does not react with the suspension and which facilitates the removal from the mold of the deposited green body.

This coating may consist of, for example, a hydrophobic synthetic resin or a liquid having a high density which cannot be mixed with the dispersing agent which forms the suspension. This favours the removal from the mold of the deposited solid in the form of a green body, and it reduces the formation of cracks during the removal operation. However, it is also possible to carry out the deposition process directly on the inner wall of the rotating hollow mold. The porous green body is dried before it is subjected to further processing. During drying, the green body is subject to a slight degree of contraction, which makes it possible to remove the green body from the hollow mold.

When the method and the arrangement according to the invention are used the following advantages are obtained: For the manufacture of the suspension, commercially available powdered solids having a coarse distribution of grain sizes can be used without having to classify them first. Thus, industrial-scale production is simplified and costs are reduced. The deposition process for forming the green body can be carried out continuously which also leads to reduced production costs.

A high output of flawless solid bodies is obtained which, if desired, may be formed of several layers having a different chemical composition. This is important, for example, in the manufacture of optical waveguides having refractive index profiles.

DETAILED DESCRIPTION OF PREFERRED EMBODIMENTS

Figure 1:
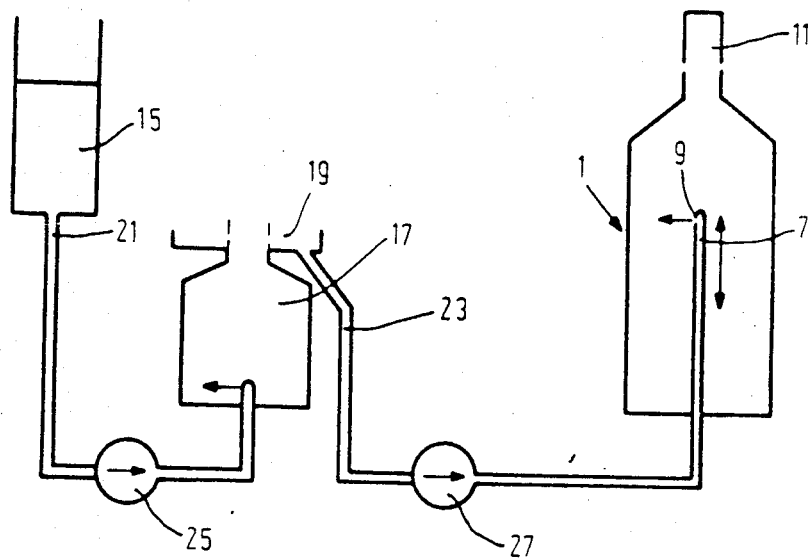
FIG. 1 is a schematic representation of an arrangement for carrying out the inventive method in a two-step process.

FIG. 1 on an enlarged scale shows an arrangement for manufacturing rotationally symmetrical solid bodies by means of centrifugal deposition in a two-step deposition process. However, a single-step process may be applied when an arrangement is used in which specific parts are omitted. Such a single-step process is described hereinafter under A, in which the required parts of the arrangement shown in FIG. 1 are described. A two-step process is described under B.

A. Single-step process.

Figure 2:
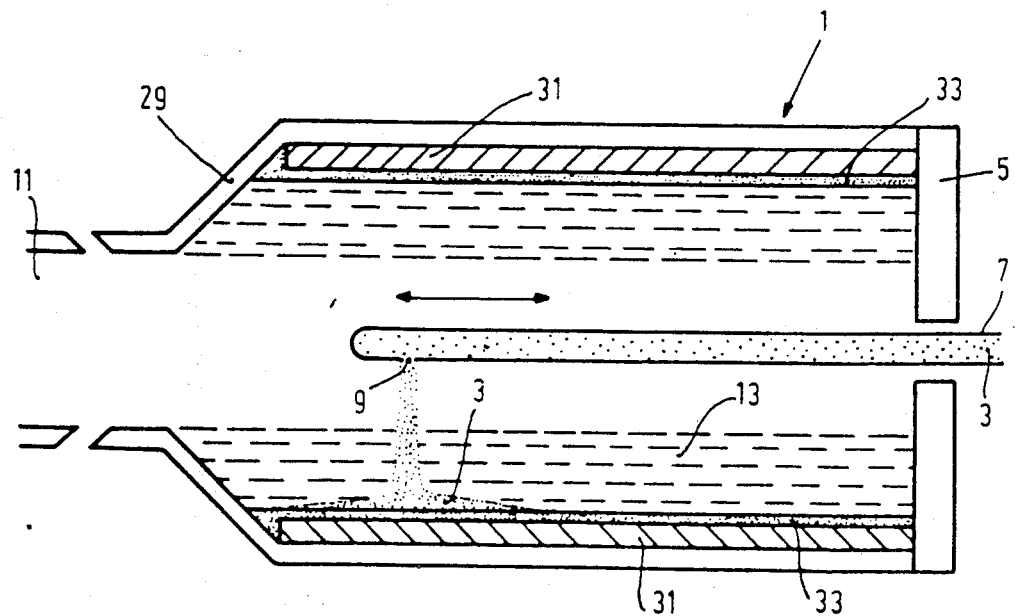
FIG. 2 is a sectional, schematic view of a hollow mold for manufacturing solid bodies, which can be rotated like a centrifuge (part of the arrangement according to FIG. 1).

Reference numeral 1 refers to a hollow mold of, for example, V4A-high-grade steel which can be driven like a centrifuge (the drive is not shown in the drawing). FIG. 2 is a sectional schematic view of the hollow mold on an enlarged scale. A sedimented solid layer (hereinafter to be referred to as green body 33) has been deposited in the inner wall of the centrifuge, on which solid layer there is a residual suspension 13 having a smaller density than that of a starting suspension 3. A suspension 3 which is used to form a solid body is introduced into the hollow mold 1 through a detachable aperture diaphragm 5 which closes the hollow mould 1 and via a feeding device 7 which can be moved over the full length of the hollow mold 1 and which has an outlet 9 having a diameter of about 1 mm. The suspension is introduced at a rate of about 2 ml/s. The rotating hollow mold 1 has an inner radius of 22 mm and a length of about 180 mm. A coating 31 having a thickness of about 3.5 mm and consisting of a hydrophobic synthetic resin is provided on the inner wall of the hollow mold 1 as a substrate for the deposition process, which coating favours the removal from the mold of a green body 33 which is deposited from the suspension 3. The hollow mold 1 is rotated about its longitudinal axis at a speed of 30000 to 35000 r.p.m. (which corresponds to an acceleration of about 25000 g) by a motor which is not shown in the drawing. Prior to the deposition process, distilled water is introduced into the hollow mold 1 through the feeding device 7 until it flows out via an overflow 11 which in the subsequent deposition process is also used to drain residual suspension 13. In this way, a liquid layer having a thickness of about 12 mm is formed on the inner surface of the wall 29 of the hollow mold 1. Subsequently, by means of a pump 25 the suspension 3 is led from a reservoir 15 through a supply pipe 21 and the feeding device 7 into the hollow mold 1, the feeding device 7 in the interior of the hollow mould 1 being subjected to a reciprocating motion at a rate of about 1 cm/s, thereby depositing a solid layer (green body 33) on the coating 31 in the interior of the hollow mold 1 in layers of about 0.2 to 0.3 mm at a deposition rate of the solid material of 24 g/min.

B. Two-step process.

FIG. 1 shows an arrangement for carrying out a two-step deposition process. A two-step deposition process is recommendable when very large solid agglomerates, undesirably large particles or particles having a high density are present in the suspension 3 which have to be removed from the suspension before the deposition of the green body 33. For this reason an additional reservoir 17 is provided, beside the reservoir 15, which can be driven like a centrifuge. To deposit the largest particles the reservoir 17 is made to rotate about its longitudinal axis at a rotational speed of about 20000 r.p.m. (which corresponds to an acceleration of about 8000 g) by a motor which is not shown in the drawing. The residual suspension which in this process flows out of an overflow 19 into a supply pipe 23 still contains about 90% of the original solids content of the suspension and is led by means of a pump 27 through the supply pipe 23 into the hollow mold 1 where the final deposition of the green body 33 takes place. Approximately 10% of the solids content of the suspension 3, consisting of the largest particles, agglomerates and particles with a high density, remain as sediment in the reservoir 17. For the above-described method a suspension was manufactured as described below:

100 g of pyrogenic silicic acid having a grain size distribution in the range from 10 to 200 nm and an average grain size of 40 nm were mixed, while stirring, with 400 ml of distilled water to form a suspension which is subsequently homogenized in an ultrasonic bath for a period of 2 hours.

By way of example, a description has been given of the manufacture of a porous solid body which can be processed further in known manner to form a very pure quartz-glass tube. A green body manufactured in accordance with the present method, for example, having an outside diameter of 36 mm and a wall thickness of about 5 mm, is characterized by a high geometric accuracy and a substantially uniform density (1.05 g/cm$^3$). The latter and the fact that also after drying and removal of the dispersing agent (by slowly heating to a temperature of about 800° C.) the pore structure is still open, enables a subsequent purification of the green body by chlorination and the sintering of said body to form quartzglass tubes. Impurities may be, for example, H$_2$O or transition metal compounds, etc. Such impurities can be removed, for example, at a temperature of 800° C. in an O$_2$ flow which has been saturated with SOCl$_2$ at room temperature and which has a flow rate of 1 to 2 l/min. In such a process, the impurities are chlorinated and disappear as a volatile phase. The resulting open-pore green body is densely sintered into a transparent glass which is free from bubbles at a temperature of 1500° C. and at a rate of 3 mm/min. in a helium/chlorine (1 to 3%) atmosphere having a pressure of $10^5$ Pa and a flow rate of 1 l/min. In this manner, a very pure transparent quartz glass having a high surface quality was obtained, which was free from bubbles and reams and which had a density of 2.2 g/cm$^3$. Residual impurities of water and transition metals amounted to less than 20 ppb.

Very pure and dimensionally accurate quartz tubes, as they can be manufactured by means of the present method and arrangement, can be applied in the manufacture of optical waveguides and also in the manufacture of halogen discharge lamps and gas discharge lamps. The present method can also be used to process any suspensions having a micro-dispersed solids content, which suspensions form the starting material for the production of rotationally symmetrical macroscopically, homogeneously formed solid bodies.

What is claimed is:

1. A method of manufacturing rotationally symmetrical porous solid bodies which comprises the steps of: providing a suspension comprising the starting material for the solid body in solid form and a liquid dispersing agent; introducing said suspension into a hollow mold whose geometry corresponds to that of the solid body to be formed while rotating the hollow mold about its longitudinal axis, thereby depositing solid of the suspension on the inner wall of the hollow mold, and removing the excess residual suspension after which the green body thus formed is subjected to further process steps to manufacture the solid body, wherein the suspension is continuously and consecutively introduced into the hollow mold by means of a feeding device which is movable over the full length of the inner wall of the hollow mold and effective to introduce said suspension in such doses that a thin solid layer having a thickness in the range from $10^{-3}$ to 5 mm is continuously and consecutively deposited without interruption of the centrifuging process, and, after the deposition of each solid layer, excess residual suspension having a density that is less than that of the suspension is continuously and consecutively removed from the hollow mold in an amount sufficient to deposit on said thin solid layer, a layer of residual suspension having a thickness in the range from $10^{-1}$ to 100 mm.

2. A method as claimed in claim 1, wherein the suspension is introduced into the hollow mold by means of a feeding device which is movable over the full length of the inner wall of the hollow mold.

3. A method as claimed in claim 1, wherein the suspension is introduced into the hollow mold, such that it is directed substantially perpendicularly to the inner wall of the rotating hollow mold.

4. A method as claimed in claim 1, wherein, initially the dispersing agent alone is introduced into the rotating hollow mold after which the suspension is introduced into the said mold.

5. A method as claimed in claim 1, wherein, for the formation of solid bodies having layers of different chemical composition, the composition of the suspensions used is changed.

6. A method as claimed in claim 1, wherein a powdered ceramic material is used as the solid to form the suspension.

7. A method as claimed in claim 6, wherein $SiO_2$ particles with or without a doping suitable for the manufacture of a desired refractive index are used as the solid for the suspension, which particles have a diameter in the range from 10 to 500 nm with an average particle diameter of 40 nm.

8. A method as claimed in claim 7, wherein distilled water is the dispersing agent.

9. A method as claimed in claim 8, wherein substances having binding properties are added to the dispersing agent.

10. A method as claimed in claim 9, wherein said substance having binding properties is polyvinyl alcohol.

11. A method as claimed in claim 10, wherein substances bringing about a chemical reaction with the solid of the suspension are added to the dispersing agent.

12. A method as claimed in claim 11, wherein ammonia is added to the dispersing agent.

13. A method as claimed in claim 12, wherein the green body obtained is removed from the mold, and treated with substances which react with the solid of the green body and which solidify the surface of the green body.

14. A method as claimed in claim 7, wherein $GeO_2$ is used as a dopant.

15. A method as claimed in claim 7 or 8, wherein a suspension having a solid to dispersing liquid weight ratio within the range of from 1:50 to 1:3 is used.

16. A method as claimed in claim 15, wherein the suspension is centrifuged at an acceleration of >15000 g.

17. A method as claimed in claim 1, wherein for the manufacture of the solid body, the green body is produced in a two-step method, in which (a) in the first step of the method the hollow mold is made to rotate at an acceleration rate lower than than necessary for depositing the solid body whereby a quantity of solid material comprising agglomerates and/or the largest particles are deposited on the inner wall of the hollow mold and purified excess residual suspension consisting of dispersing agents and smaller particles are removed, after which (b) in a second step, the purified residual suspension is introduced into a further hollow mold or a hollow mold from which the solid material deposited in the first step has been removed, and which rotates at the required acceleration rate for the deposition of the body.

18. A method as claimed in claim 17, wherein in the first step of the method the suspension is centrifuged at an acceleration from about 1000 to 8000 g.

* * * * *